(12) United States Patent
Liu et al.

(10) Patent No.: US 11,507,391 B1
(45) Date of Patent: Nov. 22, 2022

(54) NETWORK INITIALIZATION MONITORING SYSTEM

(71) Applicant: Dell Products L.P., Round Rock, TX (US)

(72) Inventors: Chih Chao Liu, Taipei (TW); Yu Hsuan Yang, Taoyuan (TW); Murali Manohar Shanmugam, Cedar Park, TX (US); Swamy Kadaba Chaluvaiah, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/511,771

(22) Filed: Oct. 27, 2021

(51) Int. Cl.
*G06F 9/44* (2018.01)
*G06F 9/4401* (2018.01)
*H04L 67/1097* (2022.01)
*G06F 9/445* (2018.01)

(52) U.S. Cl.
CPC .......... *G06F 9/4416* (2013.01); *G06F 9/4403* (2013.01); *G06F 9/4406* (2013.01); *G06F 9/44505* (2013.01); *H04L 67/1097* (2013.01)

(58) Field of Classification Search
CPC ................ G06F 1/32; G06F 9/44; G06F 1/12
See application file for complete search history.

(56) References Cited

U.S. PATENT DOCUMENTS

| 2003/0151589 | A1* | 8/2003 | Bensen | G06F 3/0481 345/156 |
|---|---|---|---|---|
| 2017/0177538 | A1* | 6/2017 | Jiang | G06F 13/102 |
| 2019/0335405 | A1* | 10/2019 | Wang | H04L 47/826 |

* cited by examiner

Primary Examiner — Keshab R Pandey
(74) Attorney, Agent, or Firm — Joseph Mencher

(57) ABSTRACT

A network initialization monitoring system includes a host device coupled to a storage system and a monitoring system via a network, and including an initialization subsystem coupled to ports. During network initialization of the host device via the storage system, the initialization subsystem provides a first instance of a communication protocol for monitored port(s), and provides a second instance of the communication protocol for a monitoring port. During the network initialization of the host device via the storage system, the first instance of the communication protocol provided for each monitored port provides copies of network initialization communications transmitted via that monitored port and the network to the second instance of the communication protocol provided for the monitoring port, and the second instance of the communication protocol provided for the monitoring port provides the copies of the network initialization communications to the monitoring system.

20 Claims, 11 Drawing Sheets

NETWORK INITIALIZATION MONITORING SYSTEM

BACKGROUND

The present disclosure relates generally to information handling systems, and more particularly to monitoring the network initialization of information handling systems.

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems such as, for example, server devices and/or other host devices known in the art, have begun to initialize via networks. For example, storage systems such as Non-Volatile Memory express over Fabric (NVMe-oF) storage systems may be provided with initialization information (e.g., an operating system and other information used by host devices for initialization), and host devices may retrieve that initialization information from the NFMe-oF storage system and use that initialization information to start up, boot, and/or otherwise initialize (e.g., load an operating system and enter a runtime state in which the operating system controls the host device). However, initialization via NVMe-oF storage systems and/or other network-based storage systems raises some issues.

The initialization discussed may be performed by the host device using the Transmission Control Protocol (TCP), and initialization via an NVMe-oF storage system using TCP involves complex network initialization functionality that utilizes NVMe-oF subsystems, discovery controllers, routers, Dynamic Host Configuration Protocol (DHCP) subsystems, Domain Name System (DNS) subsystems, and/or other subsystems known in the art. For example, subsequent to a host device powering on, a Basic Input/Output System (BIOS)/Uniform Extensible Firmware Interface (UEFI) may perform increasingly complex network communications with the NVMe-oF storage subsystem including TCP connection establishment communications (e.g., network initialization with a Universal Network Device Interface (UNDI) and/or other relatively low-level protocols), DHCP server communications (e.g., to retrieve an IP address or the NVMe-oF storage system), DNS server communications (e.g., to retrieve a domain for the NVMe-oF storage system), TCP communications with the NVMe-oF storage system (e.g., to exchange initialization information, identify a boot partition, identify an operating system, load an operating system, etc.), and/or other network communications that one of skill in the art in possession of the present disclosure would recognize as being performed during network initialization.

As will be appreciated by one of skill in the art in possession of the present disclosure, the network initialization discussed above may fail due to issues with the network communications such as, for example, inability to communicate with a DCHP server, inability to communicate with a DNS server, inability to establish a TCP connection, data transfer errors, security issues (e.g., certificate or key issues with Transport Layer Security (TLS), handshake issues, security protocol issues, host device permission issues related to the NVMe-oF storage system, host device namespace issues related to the NVMe-oF storage system, etc.), and/or other network communication issues known in the art. In response to networking initialization failure, conventional network initialization systems will typically have the host device display an error message to the network administrator or other user, and may retry the network initialization (e.g., sometimes using the same initialization/boot option, sometimes using a new/subsequent/next initialization/boot option) to see if the network initialization issue persists. In the event the network initialization issue persists, the network administrator or other user must guess what caused the network initialization issue, and then modify the host device and/or NVMe-oF storage system based on that guess in an attempt to remedy the network initialization issue, which can be time-consuming and results in downtime for the host device.

Accordingly, it would be desirable to provide a network initialization system that addresses the issues discussed above.

SUMMARY

According to one embodiment, an Information Handling System (IHS) includes a communication system; a processing system that is coupled to the communication system; and a memory system that is coupled to the processing system and that includes instructions that, when executed by the processing system, cause the system to provide an initialization engine that is configured, during network initialization of the Information Handling System (IHS) via a storage system through a network, to: provide, for at least one monitored port that is included in the communication system, a first instance of a communication protocol; and provide, for a monitoring port that is included in the communication system, a second instance of the communication protocol, wherein the first instance of the communication protocol provided for each at least one monitored port is configured, during the network initialization of the IHS via the storage system, to: provide, to the second instance of the communication protocol provided for the monitoring port, copies of network initialization communications that are transmitted via that monitored port and the network, and wherein the second instance of the communication protocol provided for the monitoring port is configured, during the network initialization of the IHS via the storage system, to: provide, to a monitoring system, the copies of the network initialization communications provided by the first instance of the communication protocol provided for each at least one monitored port.

DETAILED DESCRIPTION

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 1:
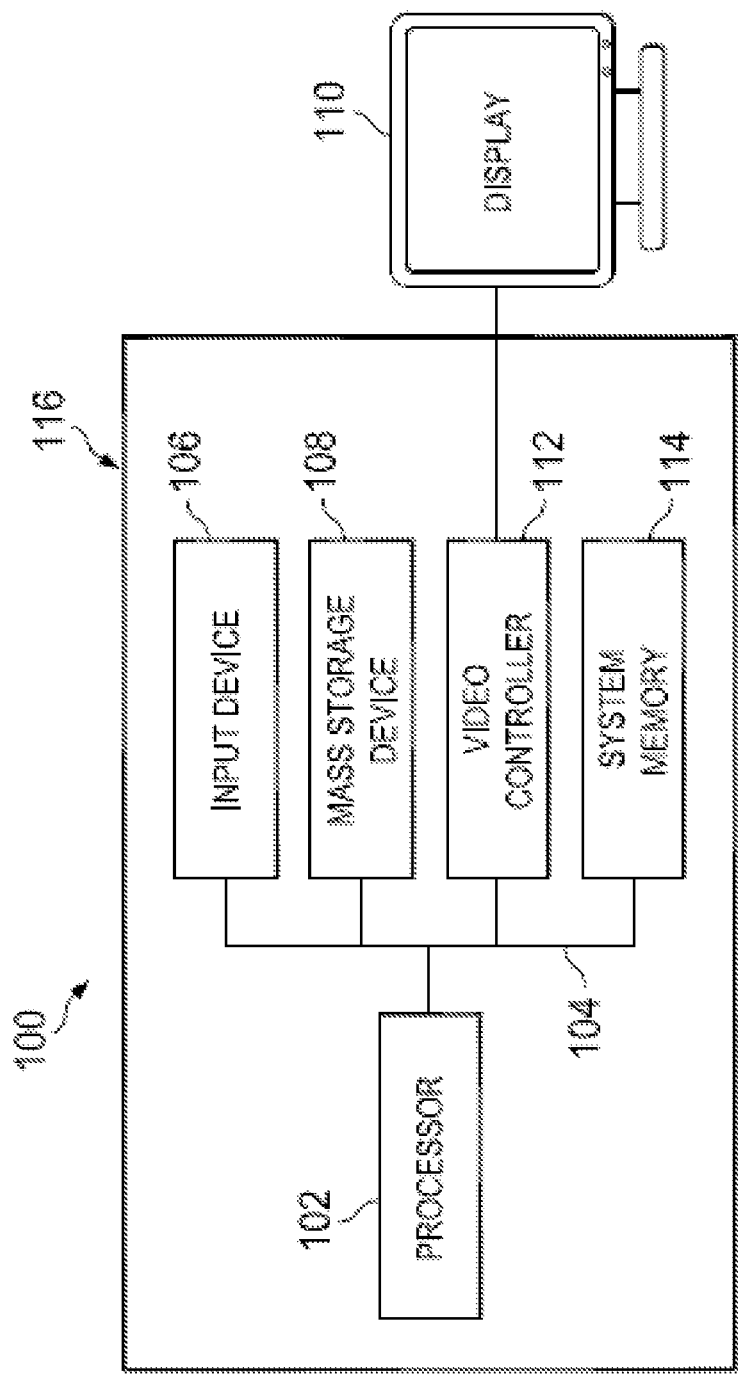
FIG. 1 is a schematic view illustrating an embodiment of an Information Handling System (IHS).

In one embodiment, IHS 100, FIG. 1, includes a processor 102, which is connected to a bus 104. Bus 104 serves as a connection between processor 102 and other components of IHS 100. An input device 106 is coupled to processor 102 to provide input to processor 102. Examples of input devices may include keyboards, touchscreens, pointing devices such as mouses, trackballs, and trackpads, and/or a variety of other input devices known in the art. Programs and data are stored on a mass storage device 108, which is coupled to processor 102. Examples of mass storage devices may include hard discs, optical disks, magneto-optical discs, solid-state storage devices, and/or a variety of other mass storage devices known in the art. IHS 100 further includes a display 110, which is coupled to processor 102 by a video controller 112. A system memory 114 is coupled to processor 102 to provide the processor with fast storage to facilitate execution of computer programs by processor 102. Examples of system memory may include random access memory (RAM) devices such as dynamic RAM (DRAM), synchronous DRAM (SDRAM), solid state memory devices, and/or a variety of other memory devices known in the art. In an embodiment, a chassis 116 houses some or all of the components of IHS 100. It should be understood that other buses and intermediate circuits can be deployed between the components described above and processor 102 to facilitate interconnection between the components and the processor 102.

Figure 2:
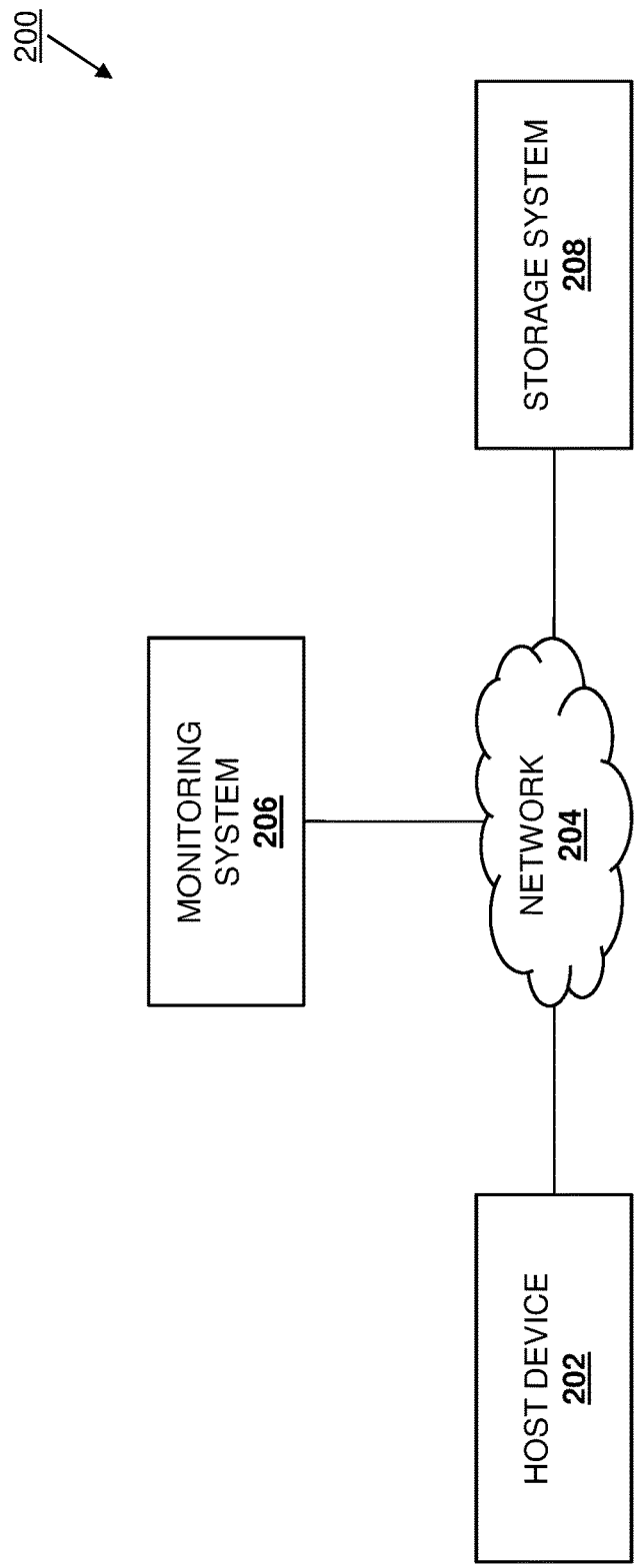
FIG. 2 is a schematic view illustrating an embodiment of a networked system that may include the network initialization monitoring system of the present disclosure.

Referring now to FIG. 2, an embodiment of a networked system 200 is illustrated. In the illustrated embodiment, the networked system 200 includes a host device 202. In an embodiment, the host device 202 may be provided by the IHS 100 discussed above with reference to FIG. 1, and/or may include some or all of the components of the IHS 100, and in specific examples may be provided by a server device. However, while illustrated and discussed as being provided by a server device, one of skill in the art in possession of the present disclosure will recognize that host devices provided in the networked system 200 may include any devices that may be configured to operate similarly as the host device 202 discussed below. In the illustrated embodiment, the host device 202 is coupled to a network 204 that may be provided by a Local Area Network (LAN), the Internet, combinations thereof, and/or any of a variety of other networks that would be apparent to one of skill in the art in possession of the present disclosure.

In the illustrated embodiment, the networked system 200 also includes a monitoring system 206 that is coupled to the network 204 as well. In an embodiment, the monitoring system 206 may be provided by the IHS 100 discussed above with reference to FIG. 1, and/or may include some or all of the components of the IHS 100, and in specific examples may be provided by one or more server devices, a desktop computing device, a laptop/notebook computing device, a tablet computing device, a phone, and/or other monitoring systems that would be apparent to one of skill in the art in possession of the present disclosure. However, while illustrated and discussed as being provided by particular devices, one of skill in the art in possession of the present disclosure will recognize that monitoring systems provided in the networked system 200 may include any devices that may be configured to operate similarly as the monitoring system 206 discussed below.

In the illustrated embodiment, the networked system 200 also includes a storage system 208 that is coupled to the network 204 as well. In an embodiment, the storage system 208 may be provided by the IHS 100 discussed above with reference to FIG. 1, and/or may include some or all of the components of the IHS 100, and in specific examples may be provided by a Non-Volatile Memory express over Fabrics (NVMe-oF) storage system, a HyperText Transfer Protocol (HTTP)/HTTP Secure (HTTPS) storage system, an Internet Small Computer Systems Interface (ISCSI) storage system, a Pre-eXecution Environment (PXE) storage system, and/or other network-connected storage systems that one of skill in the art in possession of the present disclosure would recognize as being capable of storing initialization information for the host device 202 (e.g., operating system and/or other initialization information used by host devices). However, while illustrated and discussed as being provided by particular storage systems, one of skill in the art in possession of the present disclosure will recognize that storage systems provided in the networked system 200 may include any devices that may be configured to operate similarly as the storage system 208 discussed below. As such, while a specific networked system 200 has been illustrated and described, one of skill in the art in possession of the present disclosure will recognize that the network initialization monitoring system of the present disclosure may include a variety of components and component configurations while remaining within the scope of the present disclosure as well.

Figure 3:
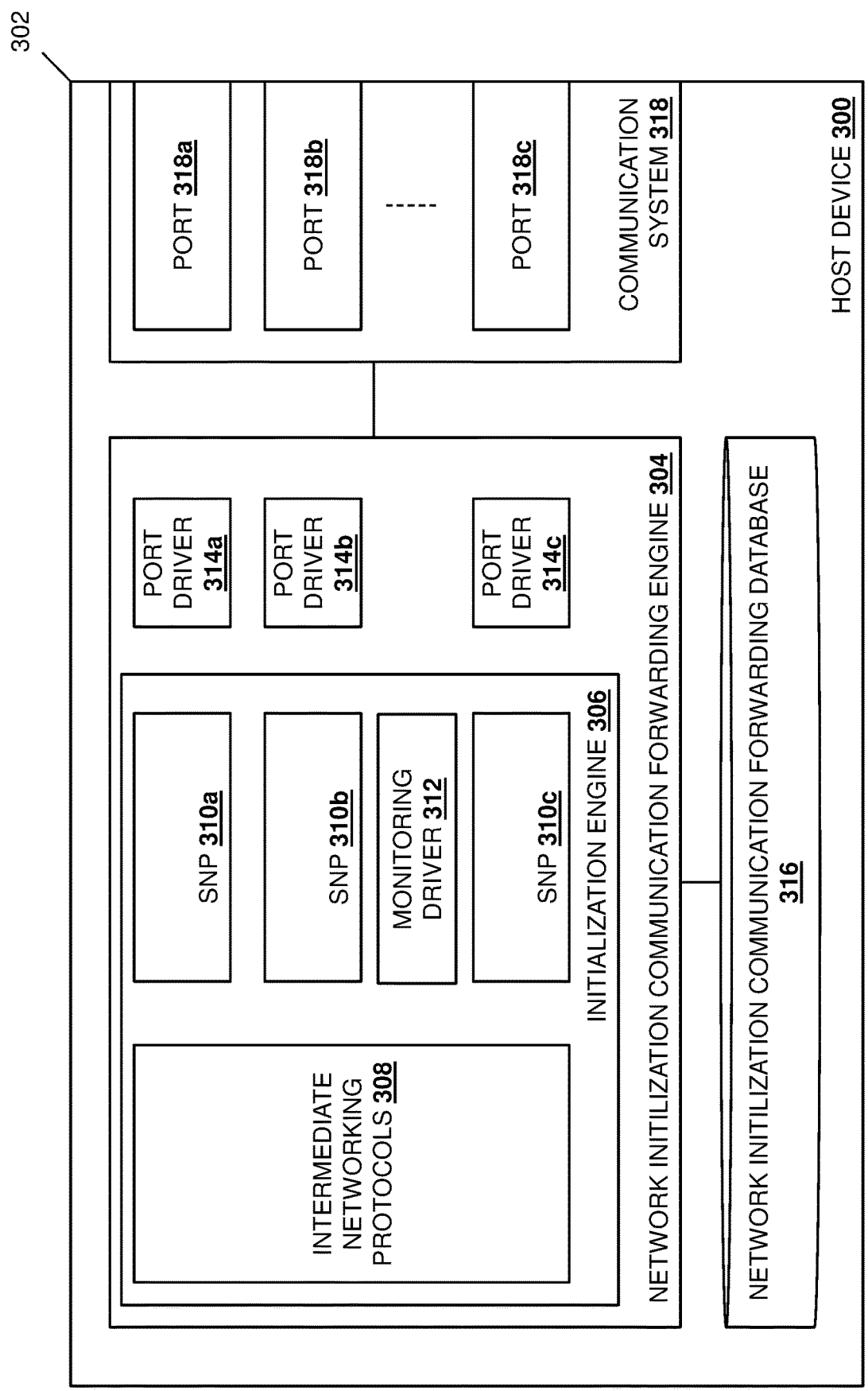
FIG. 3 is a schematic view illustrating an embodiment of a host device that may be included in the networked system of FIG. 2 and that may provide the network initialization monitoring system of the present disclosure.

Referring now to FIG. 3, an embodiment of a host device 300 is illustrated that may provide the host device 202 discussed above with reference to FIG. 2. As such, the host device 300 may be provided by the IHS 100 discussed above with reference to FIG. 1 and/or may include some or all of the components of the IHS 100, and in specific examples may be provided by a server device. However, while illustrated and discussed as being provided by a server device, one of skill in the art in possession of the present disclosure will recognize that the functionality of the host device 300 discussed below may be provided by other devices that are configured to operate similarly as the host device 300 discussed below. In the illustrated embodiment, the host device 300 includes a chassis 302 that houses the components of the host device 300, only some of which are illustrated and discussed below. For example, the chassis 302 may house a processing system (not illustrated, but which may include the processor 102 discussed above with reference to FIG. 1) and a memory system (not illustrated, but which may include the memory 114 discussed above with reference to FIG. 1) that is coupled to the processing system and that includes instructions that, when executed by the processing system, cause the processing system to provide an network initialization communication forwarding engine 304 that is configured to perform the functionality of the network initialization communication capture engines and/or host devices discussed below.

In the specific examples provided herein, the network initialization communication forwarding engine 304 may include an initialization engine 306 that may be provided by a Basic Input/Output System (BIOS) and/or Unified Extensible Firmware Interface (UEFI) that is included in the host device 300 and that one of skill in the art in possession of the present disclosure will recognize operates to perform initialization operations for the host device 300 during its startup, boot, or other initialization, as well as a variety of runtime operations known in the art. As will be appreciated by one of skill in the art in possession of the present disclosure, the network initialization communication forwarding engine 304 and the initialization engine 306 are illustrated as including components that may actually be loaded or otherwise provided during initialization of the host device 300. For example, the initialization engine 306 is illustrated as including intermediate networking protocols 308 that may include the NVMe-oF protocol, the Dynamic Host Configuration Protocol (DHCP), a Domain Name Server (DNS) protocol, the Transmission Control Protocol (TCP), the User Datagram Protocol (UDP), the Internet Protocol (IP), a Transport Layer Security (TLS) protocol, a Virtual Local Area Network (VLAN) protocol, and/or any other intermediate networking protocols that would be apparent to one of skill in the art in possession of the present disclosure.

In addition, the initialization engine 306 is also illustrated as including separate instances of a communication protocol provided for each port utilized during network initialization (discussed in further detail below), with the illustrated example providing instances 310a, 310b, and 310c of the Simple Network Protocol (SNP). As will be appreciated by one of skill in the art in possession of the present disclosure, the SNP (or other communication protocol provided for each port as discussed below) may be considered one of the intermediate networking protocols 306d discussed above, and is called out in the examples below due to its modified operation that provides some of the functionality of the network initialization communication forwarding engine 304. Furthermore, the initialization engine 306 is also illustrated as including a monitoring driver 312 that is utilized during network initialization as discussed below. Yet further still, the network initialization communication forwarding engine 304 is also illustrated as including port drivers 314a, 314b, and up to 314c for each port utilized during network initialization (discussed in further detail below), and one of skill in the art in possession of the present disclosure will appreciate how the port drivers 314a-314c may be provided by communication system drivers. In a specific example, the port drivers 314a-314c may be Network Interface Controller (NIC) device drivers that may utilize the Network Interface Identifier (NII) protocol defined in the UEFI specification, may include Universal Network Device Interfaces (UNDIs) provided according to UNDI standards used by BIOS or UEFI, and/or may include or utilize other protocols/interfaces that are provided outside the initialization engine 306 (e.g., the BIOS or UEFI). One of skill in the art in possession of the present disclosure will appreciate how the network initialization communication forwarding engine 304 and the initialization engine 306 may be configured as part of the initialization of the host device 300 to install, load, and/or otherwise provide the components of the network initialization communication forwarding engine 304 and the initialization engine 306 illustrated in FIG. 3.

The chassis 302 may also house a storage system (not illustrated, but which may include the storage 108 discussed above with reference to FIG. 1) that is coupled to the network initialization communication forwarding engine 304 (e.g., via a coupling between the storage system and the processing system) and that includes an network initialization communication forwarding database 316 that is configured to store any of the information utilized by the network initialization communication forwarding engine 304 discussed below. The chassis 302 may also house a communication system 318 that is coupled to the network initialization communication forwarding engine 304 (e.g., via a coupling between the communication system 308 and the processing system) and that may be provided by a Network Interface Controller (NIC), wireless communication systems (e.g., BLUETOOTH®, Near Field Communication (NFC) components, WiFi components, cellular components, etc.), and/or any other communication components that would be apparent to one of skill in the art in possession of the present disclosure. In the illustrated example, the communication system 318 includes a plurality of ports 318a, 318b, and up to 318c, each of which may be provided by Ethernet ports and/or any of a variety of other ports known in the art. However, while a specific host device 300 has been illustrated and described, one of skill in the art in possession of the present disclosure will recognize that host devices (or other devices operating according to the teachings of the present disclosure in a manner similar to that described below for the host device 300) may include a variety of components and/or component configurations for providing conventional host device functionality, as well as the functionality discussed below, while remaining within the scope of the present disclosure as well.

Figure 4:
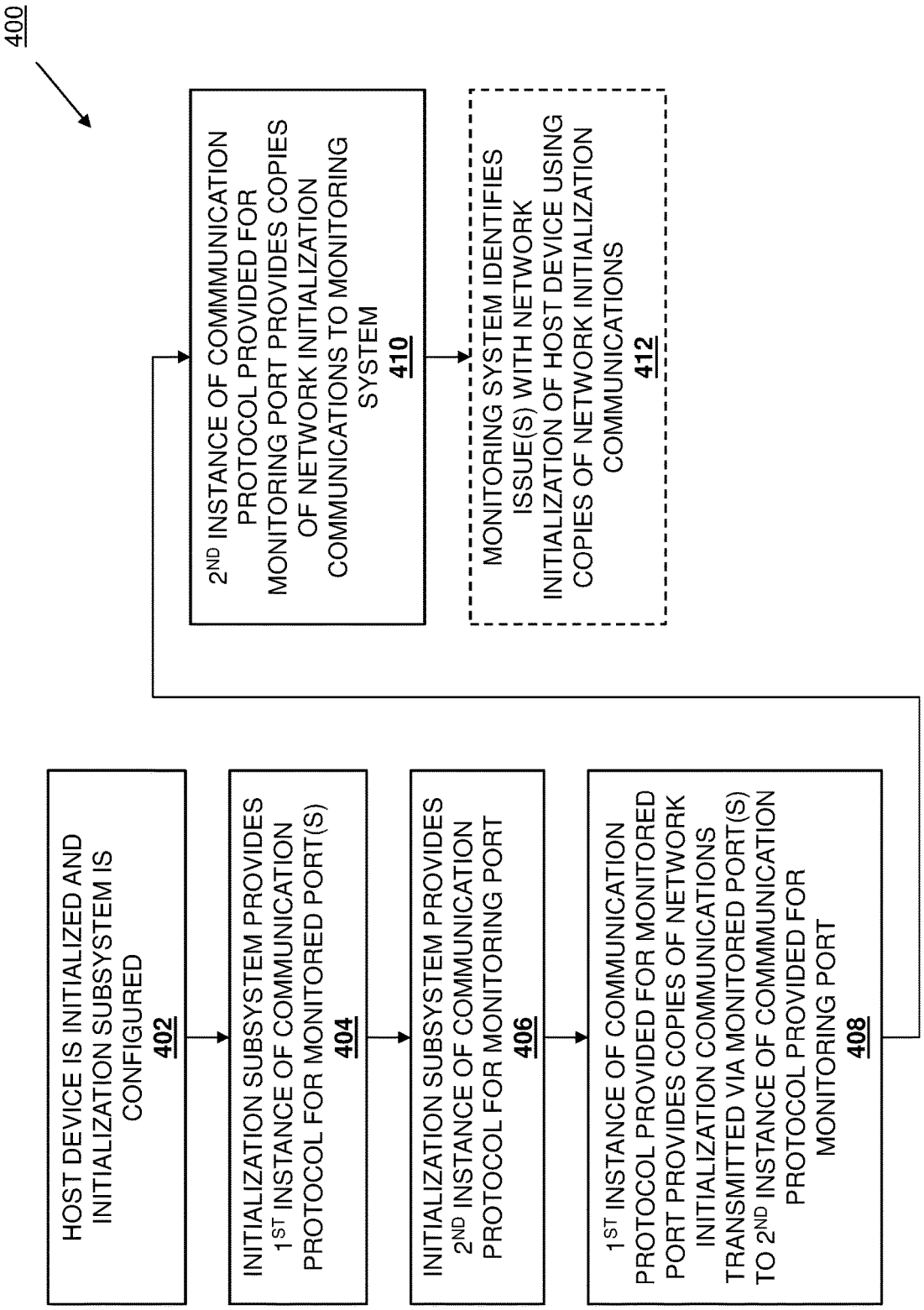
FIG. 4 is a flow chart illustrating an embodiment of a method for monitoring network initialization.

Referring now to FIG. 4, an embodiment of a method 400 for monitoring network initialization is illustrated. As discussed below, the systems and methods of the present disclosure provide for the identification and copying of network initialization communications associated with the initialization of a host device, as well as the forwarding of those network initialization communications to a monitoring system. For example, the network initialization monitoring system of the present disclosure may include a host device coupled to a storage system and a monitoring system via a network, and including an initialization subsystem coupled to ports in the host device. During network initialization of the host device via the storage system, the initialization subsystem provides a first instance of a communication protocol for monitored port(s), and provides a second instance of the communication protocol for a monitoring port. During the network initialization of the host device via the storage system, the first instance of the communication protocol provided for each monitored port provides copies of network initialization communications transmitted via that monitored port and the network to the second instance of the communication protocol provided for the monitoring port, and the second instance of the communication protocol provided for the monitoring port provides the copies of the network initialization communications to the monitoring system. As such, in the event of an issue with the network initialization of the host device, the monitoring system may analyze the network initialization communications received during the network initialization operations by that host device during that network initialization in order to identify and remedy the issue.

The method 400 begins at block 402 where a host device begins initialization and an initialization subsystem is configured. In an embodiment, at block 402, the host device 202/300 may be powered on, started up, reset, and/or otherwise initialized such that an initialization process (e.g., a Power On Self-Test (POST) process) for the host device 202/300 begins and an initialization subsystem in the host device 202/300 is configured. As will be appreciated by one of skill in the art in possession of the present disclosure, the initialization process for the host device 202/300 may last throughout the method 400 until it either completes successfully and the host device 202/300 enters a runtime state, or it fails such that the host device 202/300 is unable to enter the runtime state. As discussed above, the configuration of the initialization subsystem in the host device 300 may include the network initialization communication forwarding engine 304 and/or the initialization engine 306 loading or otherwise providing the intermediate networking protocols 308 in the initialization engine 306; loading or otherwise providing the monitoring driver 312 in the initialization engine 306; loading or otherwise providing the port drivers 314a, 314b, and up to 314c in the network initialization communication forwarding engine 304 for each of the ports 318a, 318b, and up to 318c, respectively, and/or configuring the network initialization communication forwarding engine 304 and the initialization engine 306 in any other manner that one of skill in the art in possession of the present disclosure would recognize as providing for the functionality discussed below.

The method 400 then proceeds to block 404 where the initialization subsystem provides a first instance of a communication protocol for monitored port(s), and to block 406 where the initialization subsystem provides a second instance of the communication protocol for a monitoring port. As will be appreciated by one of skill in the art in possession of the present disclosure, the operations at blocks 404 and 406 to provide the communication protocol instances for ports on the host device 202/300 may be considered as included in the initialization of the initialization subsystem at block 402. In an embodiment, at blocks 404 and 406, the network initialization communication forwarding engine 304 and/or the initialization engine 306 may load or otherwise provide separate instances of a communication protocol (e.g., the SNP 310a, 310b, and up to 310c in the illustrated examples) in the initialization engine 306 for each of the ports 318a, 318b, and up to 318c, respectively. As discussed below, in some examples, the separate instances of the communication protocol (e.g., the SNP 310a, 310b, and up to 310c in the illustrated examples) provided in the initialization engine 306 are initially all the same (and later modified), and thus blocks 404 and 406 may include providing a separate instance of the same communication protocol in the initialization engine 306 for each of the ports 318a-318c. However, as also discussed below, in some examples the separate instances of the communication protocol (e.g., the SNP 310a, 310b, and up to 310c in the illustrated examples) provided in the initialization engine 306 may operate differently for "monitored" ports and "monitoring" ports, and thus blocks 404 and 406 may include providing instances of a communication protocol in the initialization engine 306 for ports 318a-318c that operates different depending on whether they are provided for "monitored" ports or "monitoring" ports.

Figure 5:
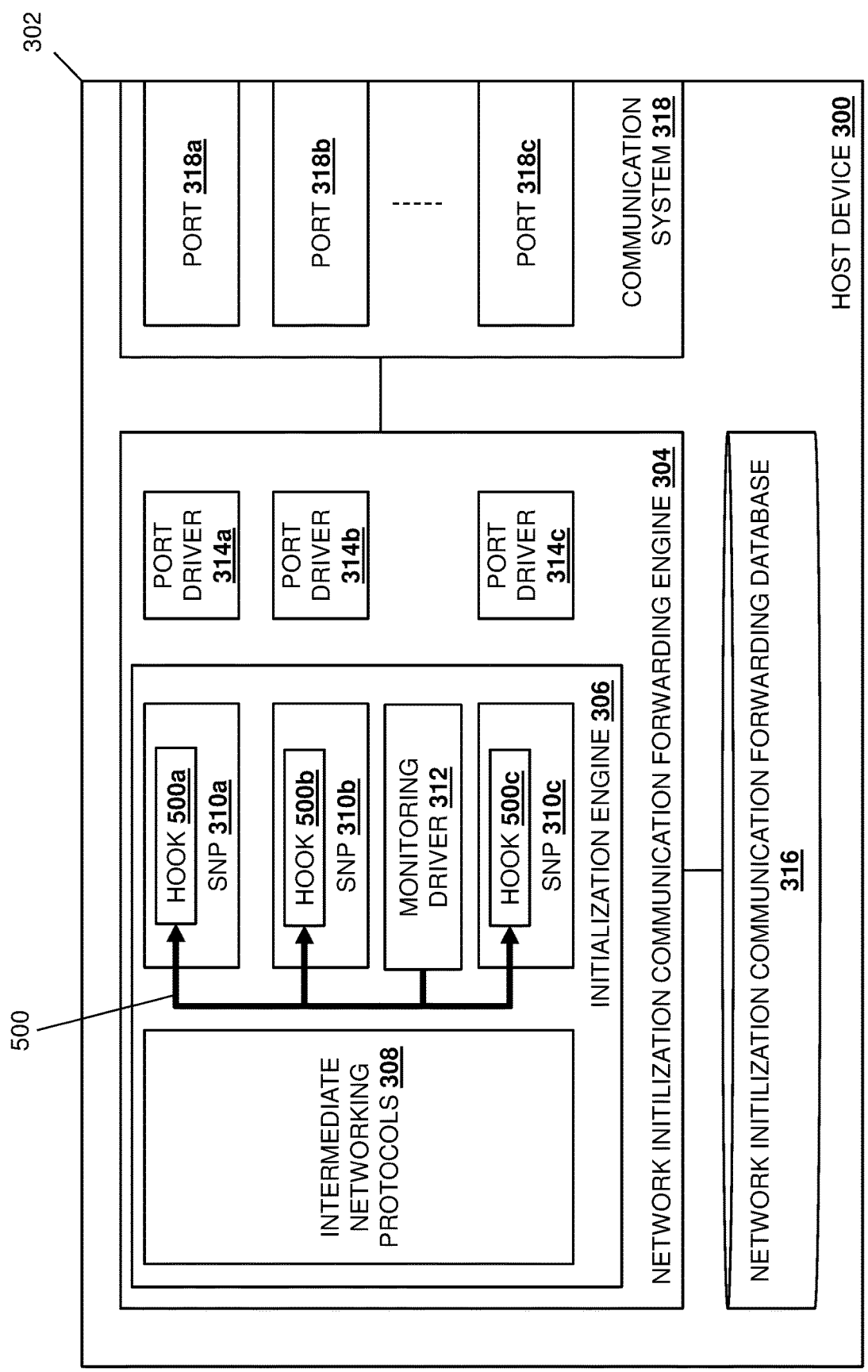
FIG. 5 is a schematic view illustrating an embodiment of the host device of FIG. 3 operating during the method of FIG. 4.

In the specific embodiment illustrated in FIG. 5, the configuration of the initialization subsystem at block 402 may also include the monitoring driver 312 (i.e., following its loading or other provisioning in the initialization engine 306) performing hook provisioning operations 500 that may include providing hooks 500a, 500b, and up to 500c on each of the separate instances of the communication protocol (e.g., the SNP 310a, 310b, and up to 310c, respectively, in the illustrated examples). For example, the separate instances of the communication protocol may each be provided by the same conventionally operating communication protocol such as the SNP 310a, 310b, and up to 310c illustrated in the examples provided herein, and thus the hooks 500a, 500b, and up to 500c, respectively, may provide modifications to the SNP 310a, 310b, and up to 310c, respectively, that cause that instance of the SNP to perform the functionality described below. As will be appreciate by one of skill in the art in possession of the present disclosure, the "hooks" described herein may include any code, instructions, and/or other programming elements that are configured to modify the operation of a communication protocol provided for a port to cause that communication protocol to perform the network initialization communication copying and copy forwarding operations discussed below, or the network initialization communication receiving and forwarding operations discussed below, while still allowing that communication protocol to also perform its conventional operations as well. Thus, in some examples, block 404 may include the network initialization communication forwarding engine 304 and/or the initialization engine 306 loading or otherwise providing the same conventionally operating communication protocol such as the SNP 310a, 310b, and up to 310c for each of the ports 318a-318c, and then providing "monitored port" hooks on the instances of the communication protocol provided for "monitored" ports, while providing "monitoring port" hooks on the instances of the communication protocol provided for "monitoring" ports.

However, while the monitoring driver 312 is described as providing a respective hook in the instance of the communication protocol provided for each of the ports 318a-318c, one of skill in the art in possession of the present disclosure will appreciate how the instance of the communication protocol provided for each of the ports 318a-318c may be configured to perform the network initialization communication copying and copy forwarding operations discussed below, or the network initialization communication receiving and forwarding operations discussed below, without the need for the hook installation described above. In other words, the SNP utilized in the present disclosure may include code or instructions that perform the network initialization communication copying and copy forwarding operations discussed below, or the network initialization communication receiving and forwarding operations discussed below, and thus the provisioning of the SNP 310a, 310b, and up to 310c for the ports 318a, 318b, and up to 318c during block 402 may allow that functionality without the need to provide the hooks 500a, 500b, and up to 500c illustrated and described in the examples provided herein during the initialization of the host device 202/300. Thus, in some examples, blocks 404 and 406 may include the network initialization communication forwarding engine 304 and/or the initialization engine 306 loading or otherwise providing an instance of a "monitored port" communication protocol (such as the modified SNP discussed above) for each of the "monitored" ports, while providing an instance of a "monitoring port" communication protocol (such as the modified SNP discussed above) for each of the "monitoring" ports.

In the examples provided herein, the ports 318a and 318b are "monitored" ports that have their network initialization communications copied and forwarded to a "monitoring" port, while the port 318c is a "monitoring" port that receives and sends copies of network initialization communications (i.e., copies of network initialization communications that are transmitted via the ports 318a and 318b during network initialization) to the monitoring system 206. As such, in some embodiments the separate instances of the communication protocol (e.g., the SNP 310a, 310b, and up to 310c) may be the same, with the hooks 500a and 500b provided by the "monitored port" hooks discussed above, and the hook 500c provided by the "monitoring port" hook discussed above. Furthermore, in other embodiments, the separate instances of the communication protocol provided for the ports 318a and 318b (e.g., the SNP 310a and 310b) may be the "monitored port" communication protocol discussed above, and the separate instance of the communication protocol provided for the port 318c (e.g., the SNP 310c) may be the "monitoring port" communication protocol discussed above. As will be appreciated by one of skill in the art in possession of the present disclosure, the "monitoring" port 318c may only have the instance of the communication protocol (e.g., the SNP 310c) provided for it, rather than other UEFI protocols that may be provided along with the SNP 310a and 310b for the "monitored" ports 318a and 318b, as the "monitoring" port 318c may only be used during network initialization to forward copies of network initialization communications. As such, any network packets received at the "monitoring" port 318c via the network 204 may be ignored.

However, one of skill in the art in possession of the present disclosure will appreciate how any subset of the ports 318a-318c may be defined as "monitored" ports that operate similarly to the ports 318a and 318b (and their associated drivers and communication protocols), and/or any subset of the ports 318a-318c may be defined as "monitoring" ports that operate similarly to the port 318c (and its associated driver and communication protocol), with the configuration operations discussed above performed to cause those ports and their associated drivers and communication protocols to operate as described herein. Furthermore, in a specific example and prior to blocks 404 and 406, the network initialization communication forwarding engine 304 and/or the initialization engine 306 may identify a subset of the ports 318a-318c that may be utilized as the "monitored" ports discussed above, and may identify a subset of the ports 318a-318c that may be utilized as the "monitoring" ports discussed above (e.g., via a user-provided definition, via automated determination of which ports will be used during network initialization, etc.), and then may perform the configuration operations discussed above accordingly. However, while specific examples are described, one of skill in the art in possession of the present disclosure will appreciate that the "monitored" port and "monitoring" port functionality described below may be enabled in other manners that will fall within the scope of the present disclosure as well.

Figure 6A:
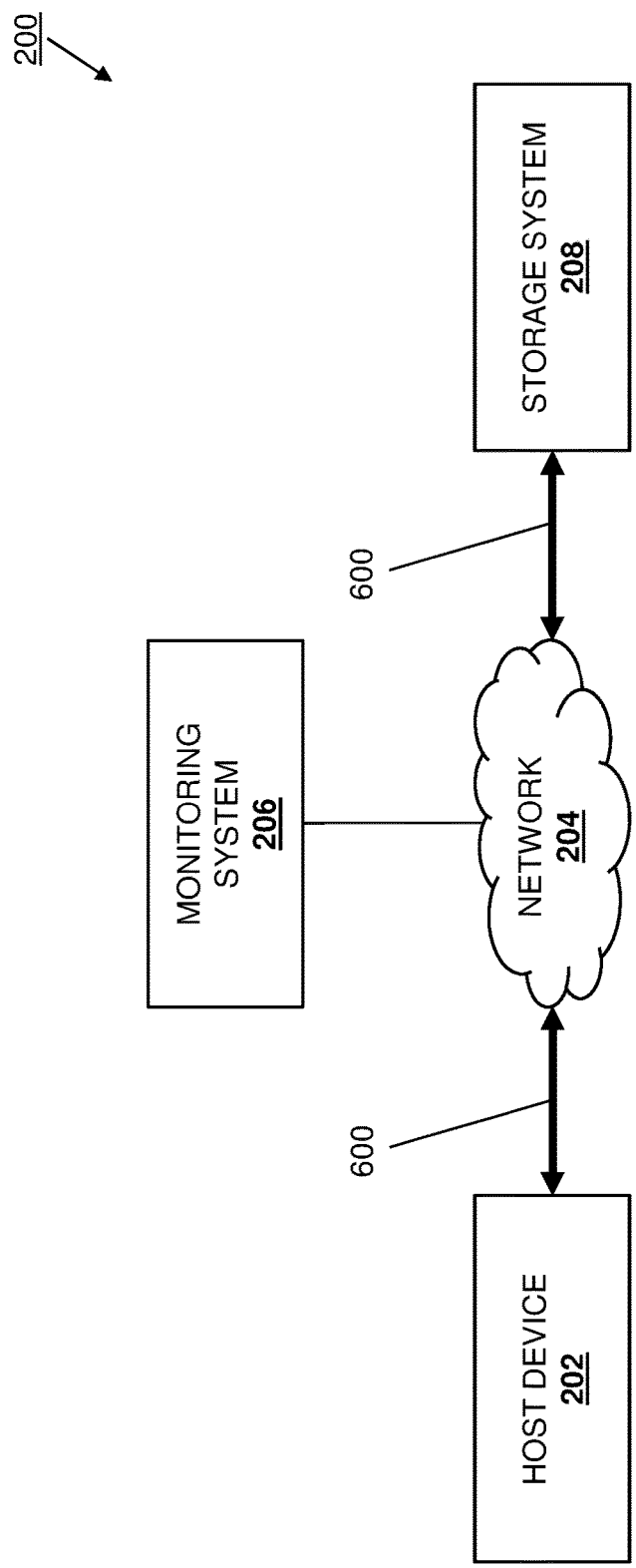
FIG. 6A is a schematic view illustrating the networked system of FIG. 2 operating during the method of FIG. 4.
Figure 6B:
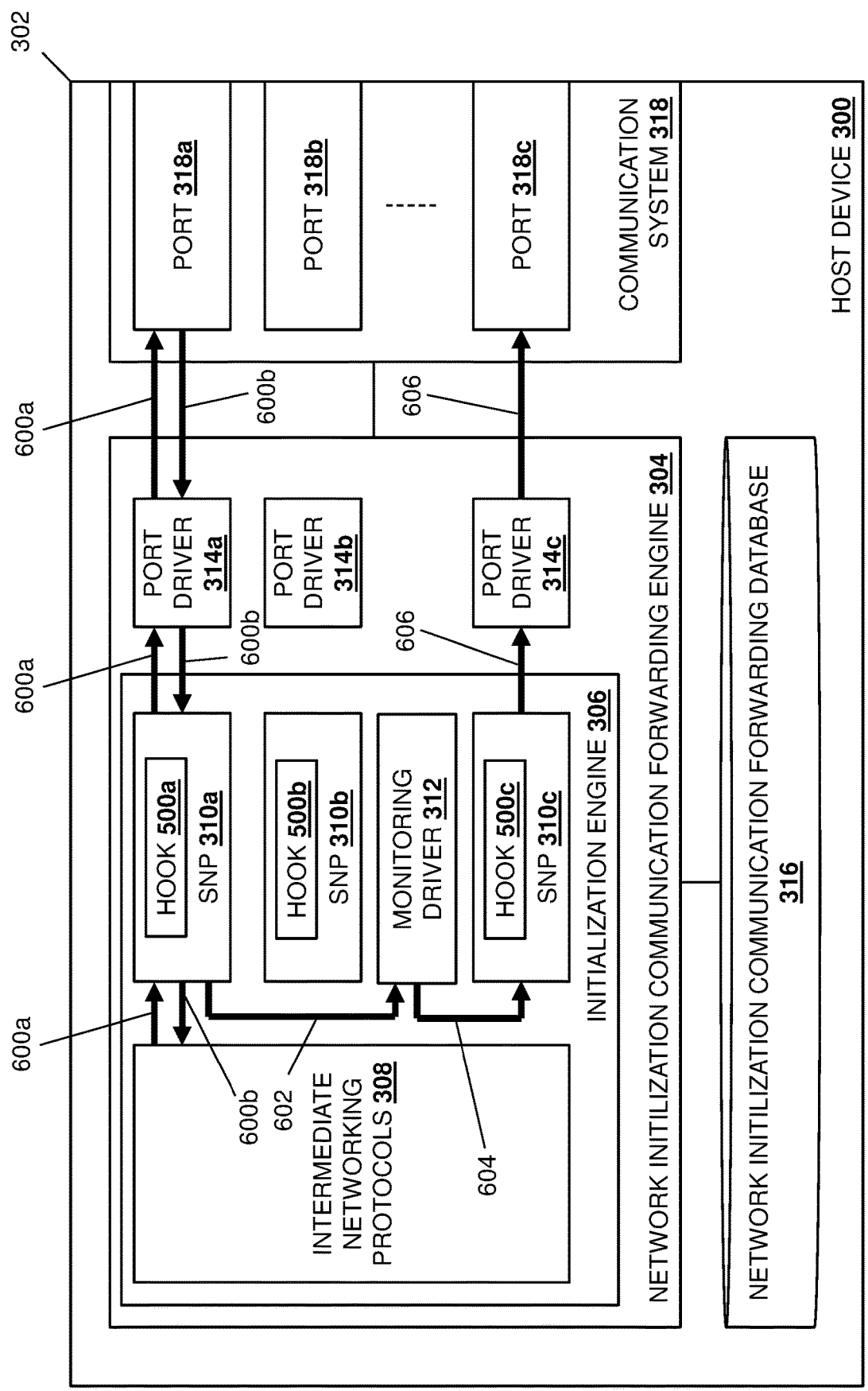
FIG. 6B is a schematic view illustrating an embodiment of the host device of FIG. 3 operating during the method of FIG. 4.
Figure 6C:
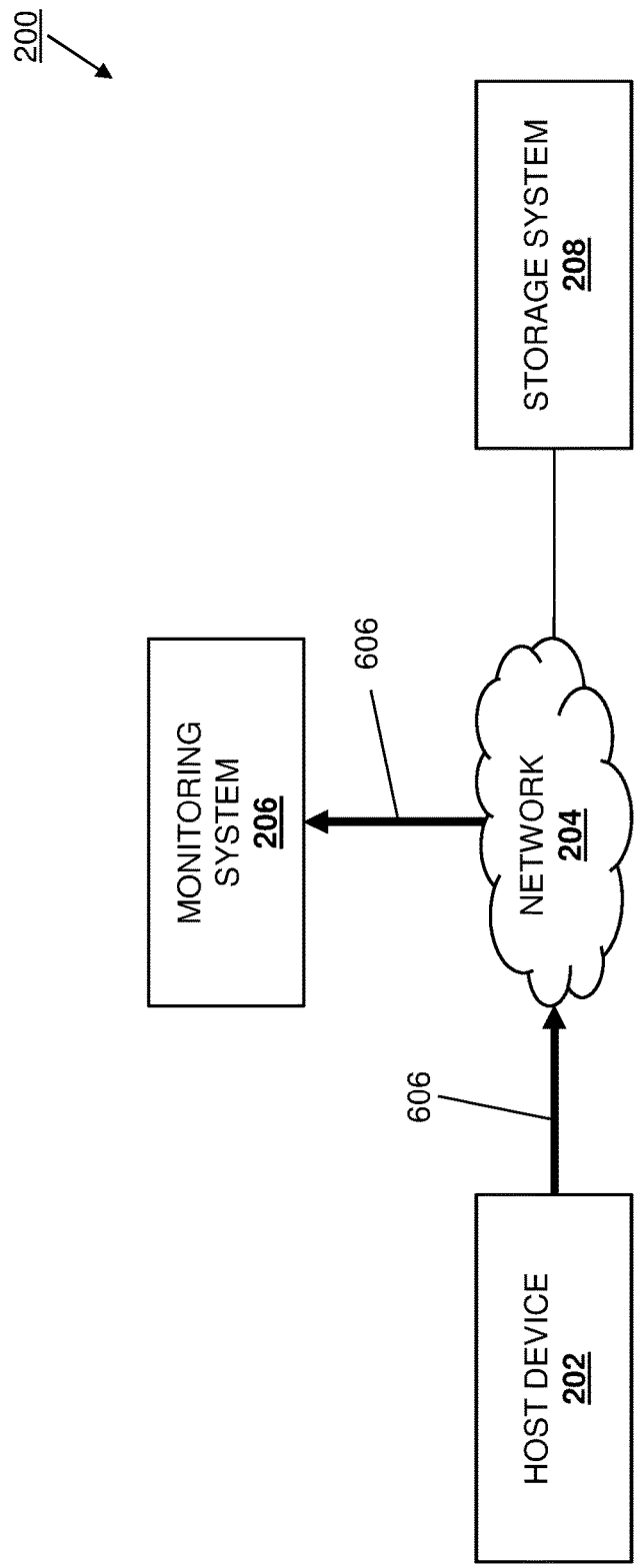
FIG. 6C is a schematic view illustrating the networked system of FIG. 2 operating during the method of FIG. 4.

The method 400 then proceeds to block 408 where the first instance of the communication protocol provided for the monitored port(s) provides copies of network initialization communications transmitted via the monitored port(s) to the second instance of the communication protocol provided for the monitoring port. With reference to FIG. 6A, in an embodiment of block 408, the host device 202/300 may perform network initialization communication transmission operations 600 that include transmitting initialization communications via the network 204 with the storage system 208. For example, FIG. 6B illustrates how the network initialization communication transmission operations 600 may include network initialization communication sending operations 600a that send network initialization communications using the intermediate networking protocols 308, the instance of the communication protocol provided for the port 318a (e.g., the SNP 310a in the illustrated example), the port driver 314a provided for the port 318a, and the port 318a, and through the network 204 to the storage system 208. FIG. 6B also illustrates how the network initialization communication transmission operations 600 may include network initialization communication receiving operations 600b that receive network initialization communications through the network 204 from the storage system 208 using the port 318a, the port driver 314a provided for the port 318a, the instance of the communication protocol provided for the port 318a (e.g., the SNP 310a in the illustrated example), and the intermediate networking protocols 308.

In a specific examples, the network initialization communication transmission operations 600 may include TCP connection establishment communications (e.g., network initialization with a Universal Network Device Interface (UNDI) and/or other relatively low-level protocols), DHCP server communications (e.g., to retrieve an IP address or the NVMe-oF storage system), DNS server communications (e.g., to retrieve a domain for the NVMe-oF storage system), TCP communications with the NVMe-oF storage system (e.g., to exchange initialization information, identify a boot partition, identify an operating system, load an operating system, etc.), and/or other network communications that one of skill in the art in possession of the present disclosure would recognize as being performed during network initialization. As such, the network initialization communication transmission operations 600 may include a plurality of incoming and outgoing network packets transmitted via the port 318a.

With reference to FIG. 6B, at block 408 the instance of the communication protocol provided for the port 318a (e.g., the SNP 310a in the illustrated example) may perform network initialization communication copying/forwarding operations 602 that include copying any network initialization communications sent or received via the port 318a as part of the network initialization communication transmission operations 600, and forwarding those copies of the network initialization communications to the monitoring driver 312. As discussed above, in some embodiments, the hook 500a in the instance of the communication protocol provided for the port 318a (e.g., the SNP 310a in the illustrated example) may perform the network initialization communication copying/forwarding operations 602. However, as also discussed above, in other embodiments the instance of the communication protocol provided for the port 318a (e.g., the SNP 310a in the illustrated example) may be configured to perform the network initialization communication copying/forwarding operations 602 without the need for installation of the hook 500a during the initialization of the host device 300 as discussed above.

With reference to FIG. 6B, at block 408 the monitoring driver 312 may perform network initialization communication copy forwarding operations 604 that include forwarding any copy of the network initialization communications, which were received from the instance of the communication protocol provided for the port 318a (e.g., the SNP 310a in the illustrated example), to the instance of the communication protocol provided for the port 318c (e.g., the SNP 310c in the illustrated example). In response to receiving the cop(ies) of the network initialization communications from the monitoring driver 312 at block 408, the instance of the communication protocol provided for the port 318c (e.g., the SNP 310c in the illustrated example) may perform network initialization communication forwarding operations 606 to forward those cop(ies) of the network initialization communications using the port driver 314c provided for the port 318c, and the port 318c, and through the network 204 to the monitoring system 206. As discussed above, in some embodiments, the hook 500c in the instance of the communication protocol provided for the port 318c (e.g., the SNP 310c in the illustrated example) may perform the network initialization communication forwarding operations 606. However, as also discussed above, in other embodiments the instance of the communication protocol provided for the port 318c (e.g., the SNP 310c in the illustrated example) may be configured to perform the network initialization communication forwarding operations 606 without the need for installation of the hook 500c during the initialization of the host device 300 as discussed above.

Figure 7A:
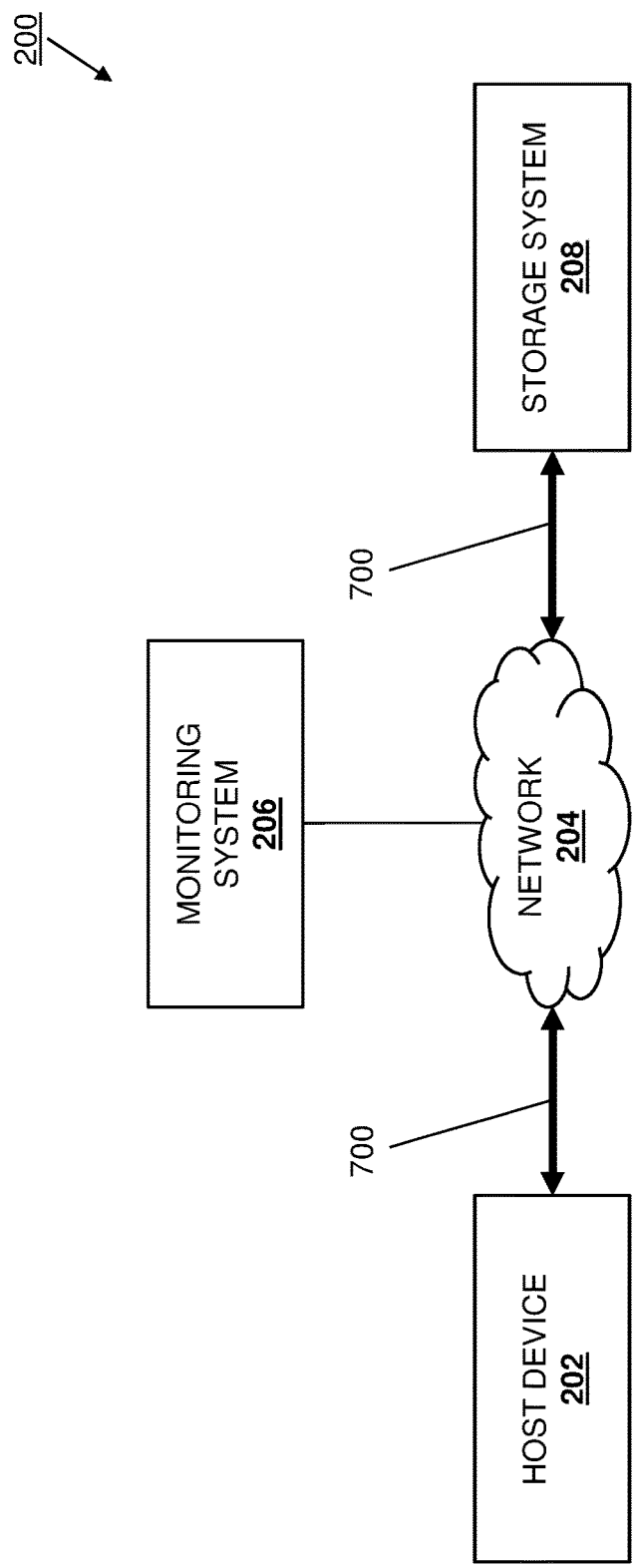
FIG. 7A is a schematic view illustrating the networked system of FIG. 2 operating during the method of FIG. 4.
Figure 7B:
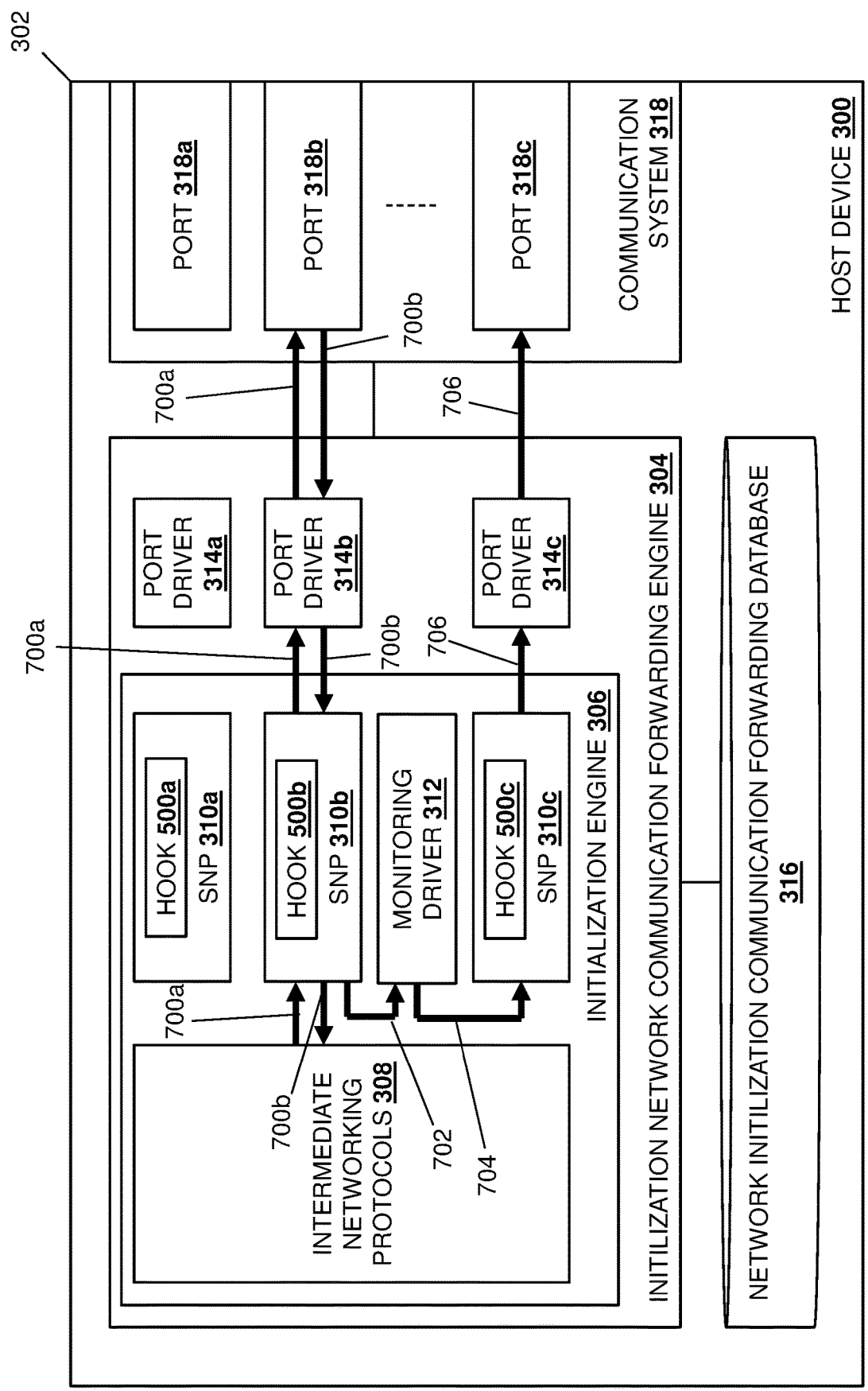
FIG. 7B is a schematic view illustrating an embodiment of the host device of FIG. 3 operating during the method of FIG. 4.
Figure 7C:
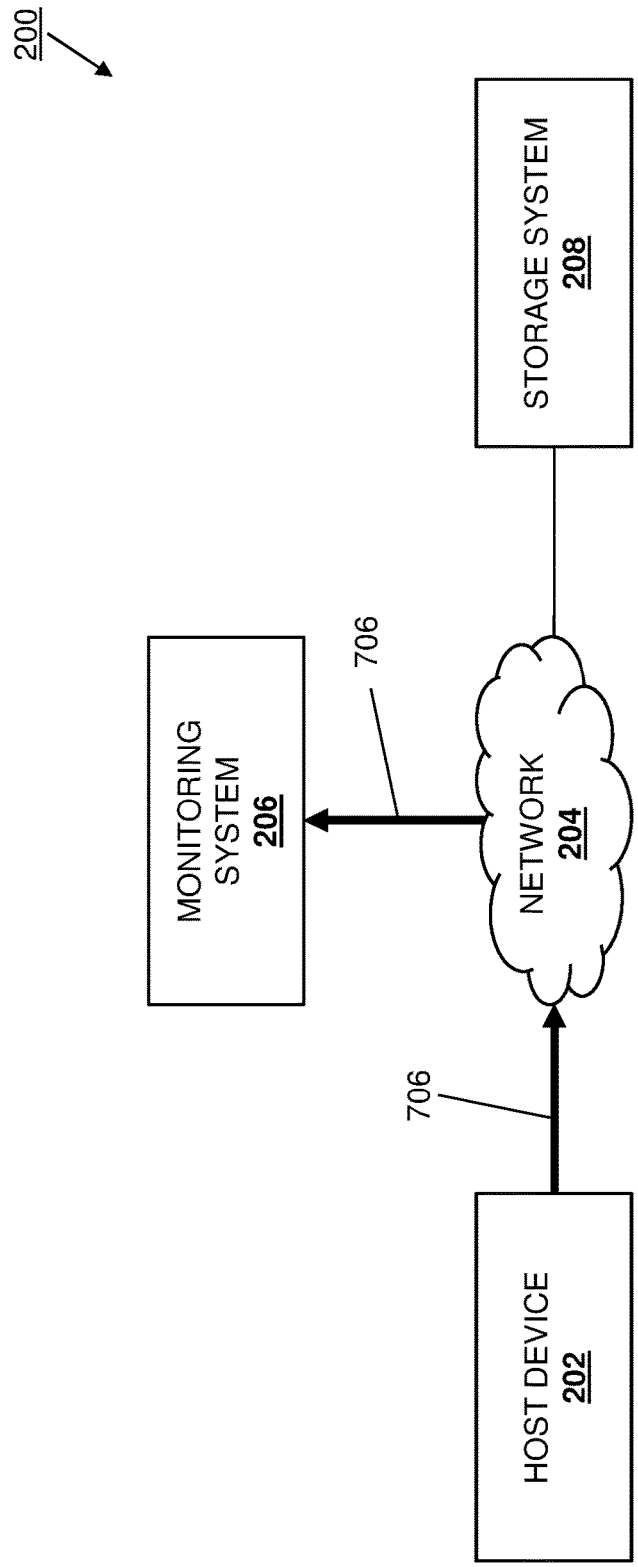
FIG. 7C is a schematic view illustrating the networked system of FIG. 2 operating during the method of FIG. 4.

The method 400 then proceeds to block 410 where the second instance of the communication protocol provided for the monitoring port provides the copies of network initialization communications to a monitoring system. With reference to FIG. 7A, in an embodiment of block 410, the host device 202/300 may perform network initialization communication transmission operations 700 that include transmitting initialization communications via the network 204 with the storage system 208. For example, FIG. 7B illustrates how the network initialization communication transmission operations 700 may include network initialization communication sending operations 700a that send network initialization communications using the intermediate networking protocols 308, the instance of the communication protocol provided for the port 318b (e.g., the SNP 310b in the illustrated example), the port driver 314b provided for the port 318b, and the port 318b, and through the network 204 to the storage system 208. FIG. 7B also illustrates how the network initialization communication transmission operations 700 may include network initialization communication receiving operations 700b that receive network initialization communications through the network 204 from the storage system 208 using the port 318b, the port driver 314b provided for the port 318b, the instance of the communication protocol provided for the port 318b (e.g., the SNP 310b in the illustrated example), and the intermediate networking protocols 308. As will be appreciated by one of skill in the art in possession of the present disclosure network initialization communication transmission operations 600 and 700 may be performed together as part of the network initialization of the host device 202/300.

As such, the network initialization communication transmission operations 700 may include TCP connection establishment communications (e.g., network initialization with a Universal Network Device Interface (UNDI) and/or other relatively low-level protocols), DHCP server communications (e.g., to retrieve an IP address or the NVMe-oF storage system), DNS server communications (e.g., to retrieve a domain for the NVMe-oF storage system), TCP communications with the NVMe-oF storage system (e.g., to exchange initialization information, identify a boot partition, identify an operating system, load an operating system, etc.), and/or other network communications that one of skill in the art in possession of the present disclosure would recognize as being performed during network initialization. As such, the network initialization communication transmission operations 700 may include a plurality of incoming and outgoing network packets transmitted via the port 318b.

With reference to FIG. 7B, at block 410 the instance of the communication protocol provided for the port 318b (e.g., the SNP 310b in the illustrated example) may perform network initialization communication copying/forwarding operations 702 that include copying any network initialization communications sent or received via the port 318b as part of the network initialization communication transmission operations 700 and forwarding those copies of the network initialization communications to the monitoring driver 312. As discussed above, in some embodiments, the hook 500b in the instance of the communication protocol provided for the port 318b (e.g., the SNP 310b in the illustrated example) may perform the network initialization communication copying/forwarding operations 702. However, as also discussed above, in other embodiments the instance of the communication protocol provided for the port 318b (e.g., the SNP 310b in the illustrated example) may be configured to perform the network initialization communication copying/forwarding operations 702 without the need for installation of the hook 500b during the initialization of the host device 300 as discussed above.

With reference to FIG. 7B, at block 410 the monitoring driver 312 may perform network initialization communication copy forwarding operations 704 that include forwarding any copy of the network initialization communications, which were received from the instance of the communication protocol provided for the port 318b (e.g., the SNP 310b in the illustrated example), to the instance of the communication protocol provided for the port 318c (e.g., the SNP 310c in the illustrated example). In response to receiving the cop(ies) of the network initialization communications from the monitoring driver 312 at block 408, the instance of the communication protocol provided for the port 318c (e.g., the SNP 310c in the illustrated example) may perform network initialization communication forwarding operations 706 to forward those cop(ies) of the network initialization communications using the port driver 314c provided for the port 318c, and the port 318c, and through the network 204 to the monitoring system 206. As discussed above, in some embodiments, the hook 500c in the instance of the communication protocol provided for the port 318c (e.g., the SNP 310c in the illustrated example) may perform the network initialization communication forwarding operations 706. However, as also discussed above, in other embodiments the instance of the communication protocol provided for the port 318c (e.g., the SNP 310c in the illustrated example) may be configured to perform the network initialization communication forwarding operations 706 without the need for installation of the hook 500c during the initialization of the host device 300 as discussed above.

The method 400 then proceeds to optional block 412 where the monitoring system identifies issue(s) with the network initialization of the host device using the copies of the network initialization communications. As will be appreciated by one of skill in the art in possession of the present disclosure, in some embodiments the network initialization of the host device 202/300 may complete such that the host device 202/300 enters a runtime state (e.g., in which an operating system controls the operation of the host device 202/300), and thus the method 400 may end. However, in other embodiments, at optional block 412 the network initialization of the host device 202/300 may fail due to issues with the network initialization communications such as, for example, inability to communicate with a DCHP server, inability to communicate with a DNS server, inability to establish a TCP connection, data transfer errors, security issues (e.g., certificate or key issues with Transport Layer Security (TLS), handshake issues, security protocol issues, host device permission issues associated with the NVMe-oF storage system, host device namespace issues associated with the NVMe-oF storage system, etc.), and/or other network communication issues known in the art. In such situations, at optional block 412, the monitoring system 206 will have received all the network initialization communications transmitted via the host device 202/300 during that failed network initialization, and may then perform any of a variety of initialization failure analysis operations known in the art (e.g., while in an operating system/runtime environment using applications like WIRESHARK open source software, TCPDUMP open source software, and/or other existing operating system network packet analysis tools) using those network initialization communications in order to identify one or more issues that resulted in the failed network initialization for the host device 202/300.

Two of the inventors of the present disclosure describe techniques for network initialization communication storage in U.S. patent application Ser. No. 17/511,700, filed on Oct. 27, 2021, the disclosure of which is incorporated by reference in its entirety. As will be appreciated by one of skill in the art in possession of the present disclosure, the functionality of the network initialization communication storage system discussed in that application may be may be combined with the network initialization monitoring functionality described herein in order to, for example, filter the network initialization communications generated by a host device during its initialization to provide filtered network initialization communications before providing those filtered network initialization communications via the network to a monitoring system.

Thus, systems and methods have been described that provide for the identification and copying of network boot communications associated with the network boot of a host device, as well as the forwarding of those network boot communications to a monitoring system. For example, the network boot monitoring system of the present disclosure may include a host device coupled to an NFMe-oF storage system and a monitoring system via a network, and including a UEFI boot subsystem coupled to ports. During network boot of the host device via the NFMe-oF storage system, the UEFI boot subsystem provides a first instance of an SNP for monitored port(s), and provides a second instance of the SNP for a monitoring port. During the network boot of the host device via the NFMe-oF storage system, the first instance of the SNP provided for each monitored port provides copies of network boot communications transmitted via that monitored port and the network to the second instance of the SNP provided for the monitoring port, and the second instance of the SNP provided for the monitoring port provides the copies of the network boot communications to the monitoring system. As such, in the event of an issue with the network boot of the host device, the monitoring system may analyze the network boot communications received during the network boot operations by that host device during that network boot in order to identify and remedy the issue. One of skill in the art in possession of the present disclosure will also appreciate how the systems and methods of the present disclosure eliminate the need to capture network packets at a switch device, router device, and/or other networking devices in order to perform network packet analysis, which can raise security concerns from the user of the host device.

Although illustrative embodiments have been shown and described, a wide range of modification, change and substitution is contemplated in the foregoing disclosure and in some instances, some features of the embodiments may be employed without a corresponding use of other features. Accordingly, it is appropriate that the appended claims be construed broadly and in a manner consistent with the scope of the embodiments disclosed herein.

What is claimed is:

1. A network initialization monitoring system, comprising:
   a storage system;
   a monitoring system; and
   a host device that is coupled to the storage system and the monitoring system via a network, wherein the host device includes:
      a plurality of ports; and
      an initialization subsystem that is coupled to each of the plurality of ports and that is configured, during network initialization of the host device via the storage system, to:
         provide, for at least one monitored port that is included in the plurality of ports, a first instance of a communication protocol; and
         provide, for a monitoring port that is included in the plurality of ports, a second instance of the communication protocol,
         wherein the first instance of the communication protocol provided for each at least one monitored port is configured, during the network initialization of the host device via the storage system, to:
            provide, to the second instance of the communication protocol provided for the monitoring port, copies of network initialization communications that are transmitted via that monitored port and the network, and
         wherein the second instance of the communication protocol provided for the monitoring port is configured, during the network initialization of
the host device via the storage system, to:
provide, to the monitoring system, the copies of
the network initialization communications provided by the first instance of the communication protocol provided for each at least one monitored port.

2. The system of claim 1, wherein the network initialization subsystem includes:
a network initialization monitoring driver that is configured, during the network initialization of the host device via the storage system, to:
provide, in the first instance of the communication protocol provided for each at least one monitored port, a first hook that configures that first instance of the communication protocol to provide the copies of the network initialization communications to the second instance of the communication protocol provided for the monitoring port.

3. The system of claim 2, wherein the network initialization monitoring driver is configured to:
receive the copies of the network initialization communications from the first instance of the communication protocol provided for each at least one monitored port; and
provide the copies of the network initialization communications to the second instance of the communication protocol provided for the monitoring port.

4. The system of claim 1, wherein the communication protocol is the Simple Network Protocol (SNP).

5. The system of claim 1, wherein the initialization subsystem is configured to:
determine that a prior initialization of the host device has failed and, in response, provide the first instance of the communication protocol for each at least one monitored port, and provide the second instance of the communication protocol for the monitoring port.

6. The system of claim 1, wherein the network initialization communications include all data transmitted via the at least one monitored port and by the host device during the network initialization of the host device via the storage system.

7. The system of claim 1, wherein the monitoring system is configured to:
receive, from the second instance of the communication protocol provided for the monitoring port, the copies of the network initialization communications; and
identifying, using the copies of the network initialization communications, at least one issue with the network initialization of the host device via the storage system.

8. An Information Handling System (IHS), comprising:
a communication system;
a processing system that is coupled to the communication system; and
a memory system that is coupled to the processing system and that includes instructions that, when executed by the processing system, cause the system to provide an initialization engine that is configured, during network initialization of the Information Handling System (IHS) via a storage system through a network, to:
provide, for at least one monitored port that is included in the communication system, a first instance of a communication protocol; and
provide, for a monitoring port that is included in the communication system, a second instance of the communication protocol,
wherein the first instance of the communication protocol provided for each at least one monitored port is configured, during the network initialization of the IHS via the storage system, to:
provide, to the second instance of the communication protocol provided for the monitoring port, copies of network initialization communications that are transmitted via that monitored port and the network, and
wherein the second instance of the communication protocol provided for the monitoring port is configured, during the network initialization of the IHS via the storage system, to:
provide, to a monitoring system, the copies of the network initialization communications provided by the first instance of the communication protocol provided for each at least one monitored port.

9. The IHS of claim 8, wherein the network initialization engine includes:
a network initialization monitoring driver that is configured, during the network initialization of the IHS via the storage system, to:
provide, in the first instance of the communication protocol provided for each at least one monitored port, a first hook that configures that first instance of the communication protocol to provide the copies of the network initialization communications to the second instance of the communication protocol provided for the monitoring port.

10. The IHS of claim 9, wherein the network initialization monitoring driver is configured to:
receive the copies of the network initialization communications from the first instance of the communication protocol provided for each at least one monitored port; and
provide the copies of the network initialization communications to the second instance of the communication protocol provided for the monitoring port.

11. The IHS of claim 8, wherein the communication protocol is the Simple Network Protocol (SNP).

12. The IHS of claim 8, wherein the initialization engine is configured to:
determine that a prior initialization of the IHS has failed and, in response, provide the first instance of the communication protocol for each at least one monitored port, and provide the second instance of the communication protocol for the monitoring port.

13. The IHS of claim 8, wherein the network initialization communications include all data transmitted via the at least one monitored port and by the IHS during the network initialization of the IHS via the storage system.

14. A method for monitoring network initialization, comprising:
providing, by an initialization subsystem in a host device for at least one monitored port that is included in the host device during network initialization of the host device via a storage system, a first instance of a communication protocol; and
providing, by the initialization subsystem in the host device for a monitoring port that is included in the host device during the network initialization of the host device via the storage system, a second instance of the communication protocol,
providing, by the first instance of the communication protocol provided for each at least one monitored port to the second instance of the communication protocol provided for the monitoring port during the network initialization of the host device via the storage system, copies of network initialization communications that are transmitted via that monitored port and the network, and providing, by the second instance of the communication protocol provided for the monitoring port to a monitoring system during the network initialization of the host device via the storage system, the copies of the network initialization communications provided by the first instance of the communication protocol provided for each at least one monitored port.

15. The method of claim 14, further comprising:

providing, by a network initialization monitoring driver in the first instance of the communication protocol provided for each at least one monitored port during the network initialization of the host device via the storage system, a first hook that configures that first instance of the communication protocol to provide the copies of the network initialization communications to the second instance of the communication protocol provided for the monitoring port.

16. The method of claim 15, further comprising:

receiving, by the network initialization monitoring driver, the copies of the network initialization communications from the first instance of the communication protocol provided for each at least one monitored port; and providing, by the network initialization monitoring driver, the copies of the network initialization communications to the second instance of the communication protocol provided for the monitoring port.

17. The method of claim 14, wherein the communication protocol is the Simple Network Protocol (SNP).

18. The method of claim 14, further comprising:

determining, by the network initialization system, that a prior initialization of the host device has failed and, in response, providing the first instance of the communication protocol for each at least one monitored port, and providing the second instance of the communication protocol for the monitoring port.

19. The method of claim 14, wherein the network initialization communications include all data transmitted via the at least one monitored port and by the host device during the network initialization of the host device via the storage system.

20. The method of claim 14, further comprising:

receiving, by the monitoring system from the second instance of the communication protocol provided for the monitoring port, the copies of the network initialization communications; and identifying, by the monitoring system using the copies of the network initialization communications, at least one issue with the network initialization of the host device via the storage system.

* * * * *